(12) United States Patent
Ishino (10) Patent No.: US 6,762,805 B2
(45) Date of Patent: Jul. 13, 2004

(54) ACTIVE MATRIX TYPE LIQUID CRYSTAL DISPLAY DEVICE AND METHOD OF FABRICATING THE SAME

(75) Inventor: Takayuki Ishino, Izami (JP)

(73) Assignee: NEC LCD Technologies, Ltd., Kanagawa (JP)

(*) Notice: Subject to any disclaimer, the term of this patent is extended or adjusted under 35 U.S.C. 154(b) by 70 days.

(21) Appl. No.: 10/163,612

(22) Filed: Jun. 7, 2002

(65) Prior Publication Data

US 2002/0196382 A1 Dec. 26, 2002

(30) Foreign Application Priority Data

Jun. 8, 2001 (JP) ........................................ 2001-173578

(51) Int. Cl.[7] ........................ G02F 1/136; G02F 1/1345
(52) U.S. Cl. ........................................ 349/46; 349/143
(58) Field of Search .............................. 349/43, 44, 46, 349/111, 143

(56) References Cited

U.S. PATENT DOCUMENTS 4,857,907 A * 8/1989 Koden .......................... 349/140
5,345,324 A * 9/1994 Koseki et al. ................. 349/44
5,414,547 A * 5/1995 Matsuo et al. ................ 349/44
5,686,977 A * 11/1997 Kim et al. ..................... 349/38
5,986,723 A * 11/1999 Nakamura et al. ............ 349/39
6,008,874 A * 12/1999 Kouno et al. ................ 349/123
6,249,325 B1 * 6/2001 Ohkawara et al. ............ 349/38

FOREIGN PATENT DOCUMENTS

| JP | 06-082832 | 3/1994 |
|---|---|---|
| JP | 08-262495 | 10/1996 |
| JP | 10-239678 | 9/1998 |
| JP | 11-119253 | 4/1999 |

* cited by examiner

Primary Examiner—Kenneth Parker
(74) Attorney, Agent, or Firm—Foley & Lardner LLP

(57) ABSTRACT

An active matrix type liquid crystal display device includes (a) a transparent substrate, (b) a plurality of scanning lines formed on the transparent substrate, (c) a plurality of signal lines formed on the transparent substrate perpendicularly to the scanning lines, (d) a transparent electrode arranged in a pixel area defined by the scanning and signal lines, and (e) a thin film transistor formed in association with the transparent electrode, the thin film transistor being formed in an area at which one of the scanning lines and one of the signal lines intersect with each other, the thin film transistor including source and drain regions both comprised of an electrically conductive film of which the signal lines are comprised.

20 Claims, 10 Drawing Sheets

ACTIVE MATRIX TYPE LIQUID CRYSTAL DISPLAY DEVICE AND METHOD OF FABRICATING THE SAME

BACKGROUND OF THE INVENTION

1. Field of the Invention

The invention relates to an active matrix type liquid crystal display device and a method of fabricating the same, and more particularly to an active matrix type liquid crystal display device which is capable of enhancing an aperture ratio and displaying images with high brightness without an increase in complexity in fabrication, and a method of fabricating such an active matrix type liquid crystal display device.

2. Description of the Related Art

In an active matrix type liquid crystal display device including a backlight source, a backlight intensity is usually enhanced for displaying images with a high brightness. However, this would consume much power, which does not satisfy small power consumption which is required in any display device.

In order to enhance a brightness in a liquid crystal display device including a backlight source, it is frequently carried out to enhance a light-transmission ratio. However, enhancement of a light-transmission ratio in a liquid crystal display device is equivalent to enhancement of a transmission ratio in a color filter which contributes to reduction in a light-transmission ratio. In order to enhance a transmission ratio in a color filter, a content ratio of pigment in a color filter is usually reduced, or a thickness of a color filter is reduced with a content ratio of pigment being kept as it is. However, if a transmission ratio in a color filter is enhanced by doing so, it would be necessary to control a color of backlight.

For the above-mentioned reason, it is usually carried out to enhance an aperture ratio of an opening in a substrate on which a thin film transistor is fabricated, in order to enhance a light-transmission ratio of a liquid crystal display device. Specifically, an area of each of pixels arranged in an opening is increased by reducing a wiring width and/or a size of a transistor, for instance.

Figure 1:
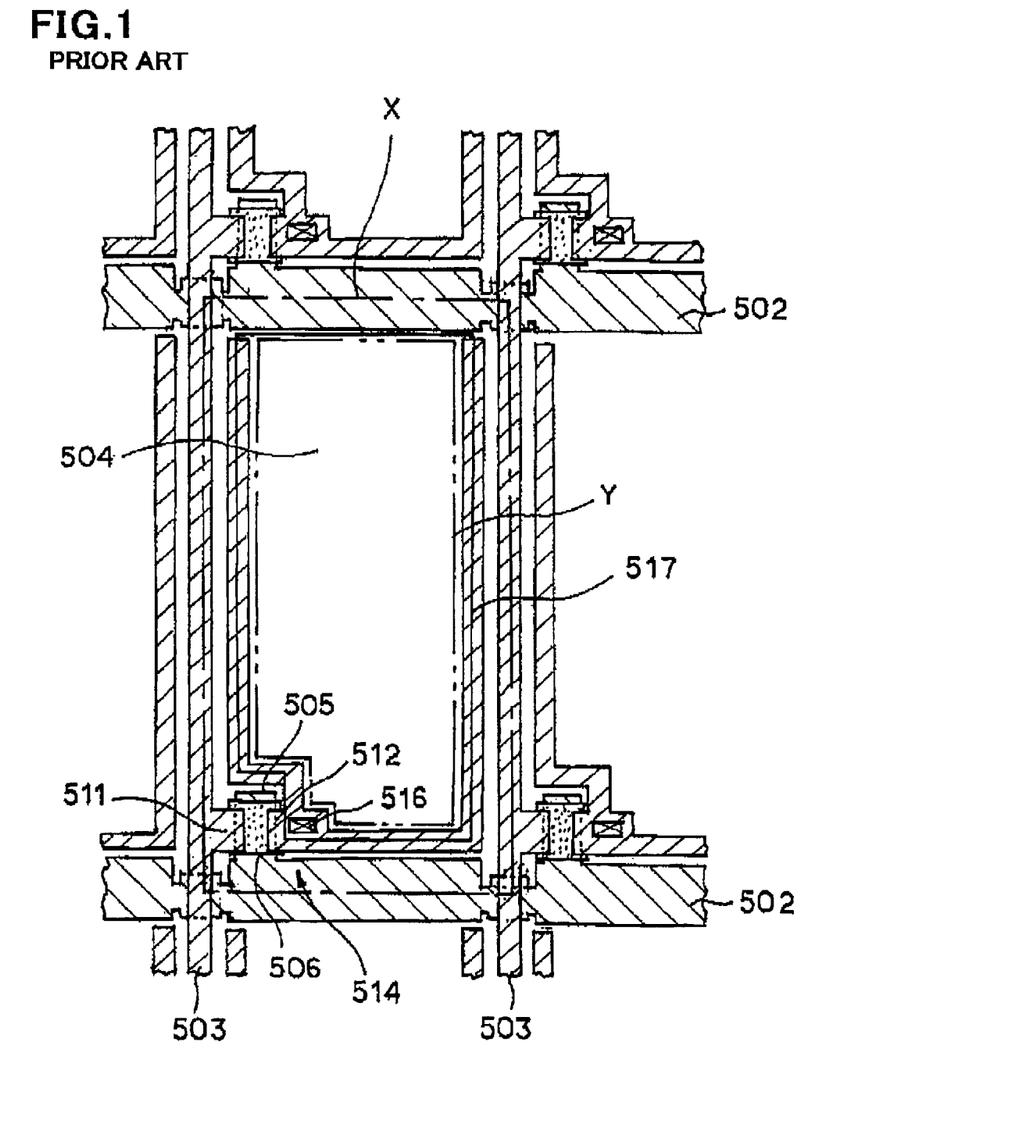
FIG. 1 is a top plan view of a TFT substrate in a conventional liquid crystal display device including a backlight device.

FIG. 1 is a top plan view of a TFT substrate in a conventional liquid crystal display device including a backlight device.

In the illustrated liquid crystal display device, a plurality of scanning lines or gate lines 502 and a plurality of signal lines and drain lines 503 are formed on a transparent substrate in a matrix perpendicularly to each other. An area surrounded by each of the scanning lines 502 and each of the signal lines 503 defines a pixel area 504.

A gate electrode 505 is formed of a portion of each of the scanning lines 502 at a corner of the pixel area 504. On the gate electrode 505 is formed an island 506 comprised of a semiconductor layer, and on the island are formed a drain electrode 511 and a source electrode 512. The gate electrode 505, the island 506, the drain electrode 511 and the source electrode 512 constitute a thin film transistor (TFT) 514.

A transparent electrode 517 composed of indium tin oxide (ITO) is formed in the pixel area 504. The source electrode 512 is electrically connected to the transparent electrode 517 through a contact hole 516. The drain electrode 511 is formed integral with one of the signal lines 503.

The scanning lines 502, the signal lines 503 and the thin film transistor 514 are covered with a black matrix layer formed on an opposing substrate (not illustrated). An area other than the black matrix layer defines an aperture.

With reference to FIG. 1, a pixel area theoretically separated in a substrate on which the thin film transistor 514 is fabricated, specifically, a pixel area defined by a dotted line X is defined as a maximum aperture, and an area in which images are displayed by means of the transparent electrode 514, specifically, an area defined by a dotted line Y is defined as an actual aperture. An aperture ratio in the illustrated liquid crystal display device is defined as a ratio of an area of the actual aperture to an area of the maximum aperture, that is, Y/X.

Hence, in order to increase an aperture ratio without changing a size of each of the pixel areas used for displaying images, a width of wirings such as the scanning and signal lines 502 and 503 covered with the black matrix layer may be reduced. However, this causes an increase in a resistance of the wirings, preventing a high-rate operation of a liquid crystal display device.

If the thin film transistor 514 and the contact hole 516 were reduced in size without changing a size of a pixel area, characteristics of the thin film transistor 514 would be deteriorated with the result of degradation in displayed images. Thus, it is quite difficult to increase an aperture ratio merely by reducing a size of wirings and/or the thin film transistor 514.

With reduction in a size of a pixel in accordance with a requirement to displaying images at a higher density, a ratio of wirings and/or a thin film transistor to a maximum aperture becomes greater, resulting reduction in an aperture ratio. That is, displaying image at a high density causes reduction in a maximum aperture.

However, a size of wirings and a thin film transistor reaches its lower limitation. As a result, only an area of an actual aperture is reduced, and resultingly, an aperture ratio defined as a ratio of an area of the actual aperture to an area of the maximum aperture (Y/X) is reduced. Even so, if wirings, a thin film transistor and a contact hole were reduced in size in accordance with reduction in the maximum aperture, an aperture ratio remains unchanged. However, as mentioned earlier, a resistance of wirings would be increased, and characteristics of a thin film transistor would be deteriorated.

Japanese Unexamined Patent Publication No. 8-262495 (A) has suggested a liquid crystal display device for the purpose of enhancing an aperture ratio.

In the suggested liquid crystal display device, a thin film transistor is arranged in an area at which a scanning line or a gate line and a signal line or a drain line intersect with each other. By arranging a thin film transistor in such an area, it is no longer necessary to arrange a thin film transistor in a maximum aperture, ensuring enhancement of an aperture ratio.

In the suggested liquid crystal display device, a semiconductor layer such as an amorphous silicon layer is formed on a scanning line in the above-mentioned area, and then, source and drain electrodes are formed on the semiconductor layer to thereby fabricate a thin film transistor. Then, a signal line is formed so as to cover the thin film transistor therewith, and subsequently, a drain electrode is electrically connected to the signal line.

Thus, a process of fabricating the suggested liquid crystal display device includes two photolithography steps, that is, a first photolithography step of forming source and drain electrode, and a second photolithography step of forming a signal line.

In a conventional process of fabricating a liquid crystal display device, a photolithography step is carried out only once, because source and drain electrodes are formed concurrently with formation of a signal line. Thus, a process of fabricating the suggested liquid crystal display device has to carry out a photolithography step once greater than a conventional process of fabricating a liquid crystal display device, resulting in complexity in fabrication of a liquid crystal display device.

Japanese Unexamined Patent Publication No. 6-82832 (A) has suggested a liquid crystal display device including a TFT substrate comprised of an electrically insulating substrate, a plurality of gate lines formed on the substrate, a plurality of signal lines formed on the substrate perpendicularly to the gate lines, a plurality of thin film transistors, and pixel electrodes. Each of the gate lines is comprised of a gate wiring layer formed in a recess formed at a surface of the substrate.

Japanese Unexamined Patent Publication No. 10-239678 (A) has suggested a thin film transistor array substrate including an electrically insulating transparent substrate, a plurality of gate electrode lines formed on the substrate, a gate insulating film covering the gate electrode lines therewith, a plurality of source electrode lines intersecting with the gate electrode lines with the gate insulating film being sandwiched therebetween, a thin film transistor formed at an intersection of each of the gate electrode lines and each of the source electrode lines, a pixel electrode comprised of an electrically conductive film and electrically connected to a drain electrode of the thin film transistor, a capacitance electrode facing the pixel electrode with the gate insulating film being sandwiched therebetween to thereby define a capacity, and a black matrix layer formed below the pixel electrode and each of the source electrode lines and above the substrate. The black matrix layer is composed of the same material as a material of which the gate electrode lines are composed. The black matrix layer is electrically connected to the source electrode lines through a contact hole formed throughout the gate insulating film.

Japanese Unexamined Patent Publication No. 11-119253 (A) has suggested an active matrix type liquid crystal display device including a substrate, a plurality of scanning lines formed on the substrate, a plurality of signal lines formed on the substrate perpendicularly to the scanning lines, and a switching device fabricated in the vicinity of an intersection at which the scanning lines intersect with the signal lines. A pixel electrode is electrically connected to a drain electrode of the switching device. Each of the scanning lines is formed with apertures at opposite sides about each of the signal lines in the intersection. The apertures are covered with an electrically insulating film. Each of the apertures is covered with a part of the switching device or each of the signal lines.

However, the above-mentioned problems remain unsolved even in the above-mentioned Publications.

SUMMARY OF THE INVENTION

In view of the above-mentioned problems in the conventional liquid crystal display devices, it is an object of the present invention to provide an active matrix type liquid crystal display device which is capable of enhancing an aperture ratio without an increase in complexity in fabrication of the same.

It is also an object of the present invention to provide a method of fabricating such an active matrix type liquid crystal display device.

In one aspect of the present invention, there is provided an active matrix type liquid crystal display device including (a) a transparent substrate, (b) a plurality of scanning lines formed on the transparent substrate, (c) a plurality of signal lines formed on the transparent substrate perpendicularly to the scanning lines, (d) a transparent electrode arranged in a pixel area defined by the scanning and signal lines, and (e) a thin film transistor formed in association with the transparent electrode, and wherein the thin film transistor is formed in an area at which one of the scanning lines and one of the signal lines intersect with each other, and the thin film transistor includes source and drain regions both comprised of an electrically conductive film of which the signal lines are comprised.

For instance, the thin film transistor may be comprised of (e1) an island including a gate insulating film and a semiconductor layer both formed on each of the scanning lines in the area at which one of the scanning lines and one of the signal lines intersect with each other, (e2) a drain electrode comprised of a part of each of the signal lines which part extends across the island, and (e3) a source electrode comprised of an electrically conductive film of which each of the signal lines is comprised, and formed on the island with being spaced away from the drain electrode.

It is preferable that the active matrix type liquid crystal display device further includes a light-shielding layer surrounding the transparent electrode and being connected to the source electrode, the light-shielding layer being formed with a contact hole through which the source electrode is electrically connected to the transparent electrode.

It is preferable that the light-shielding layer has a portion having an increased width, the contact hole being formed at the portion. As an alternative, the light-shielding layer may have a uniform width, in which case, it is preferable that the contact hole has a rectangular cross-section having a longer side extending in a length-wise direction of the light-shielding layer.

It is preferable that each of the scanning lines has a portion having a decreased width in the area at which one of the scanning lines and one of the signal lines intersect with each other, the portion acting as a gate electrode of the thin film transistor.

It is preferable that the active matrix type liquid crystal display device further includes an island formed on each of the scanning lines at the portion having a decreased width, the island including a gate insulating film and a semiconductor layer both of which is greater in width than the portion.

It is preferable that the active matrix type liquid crystal display device further includes a first ohmic layer and a second ohmic layer both formed on the semiconductor layer such that the first and second ohmic layers are spaced away from each other, the first ohmic layer being formed as an extension of each of the signal lines and acting as a drain electrode of the thin film transistor, the second ohmic layer acting as a source electrode of the thin film transistor.

It is preferable that each of the signal lines has a portion having a decreased width in the area at which one of the scanning lines and one of the signal lines intersect with each other, the portion acting as a drain electrode of the thin film transistor.

In another aspect of the present invention, there is provided a method of fabricating an active matrix type liquid crystal display device, including the steps of (a) forming a plurality of scanning lines on a transparent substrate, (b) forming an island in an area at which one of the scanning lines and one of later mentioned signal lines intersect with each other, the island including a gate insulating film, a semiconductor layer and an ohmic layer all formed on each of the scanning lines in this order, (c) forming a plurality of signal lines extending perpendicularly to the scanning lines, each of the signal lines including a portion located on the island and acting as a drain electrode, (d) forming a source electrode on the island such that the source electrode faces and is spaced away from the drain electrode, (e) forming an interlayer insulating film entirely over a resultant resulted from the step (d), (f) forming a contact hole so that the source electrode partially appears, (g) forming a transparent electrode in a pixel area defined by the scanning and signal lines, and (g) electrically connecting the transparent electrode to the source electrode through the contact hole.

For instance, the steps (c) and (d) may be concurrently carried out.

It is preferable that each of the signal lines and the source electrode are concurrently formed in a common photolithography step.

It is preferable that the method further includes the step of forming a light-shielding layer which surrounds the transparent electrode and is connected to the source electrode, the light-shielding layer being formed with the contact hole.

It is preferable that the light-shielding layer is formed to have a portion having an increased width, the contact hole being formed at the portion.

It is preferable that the light-shielding layer is formed to have a uniform width, and the contact hole is formed to have a rectangular cross-section having a longer side extending in a length-wise direction of the light-shielding layer.

It is preferable that each of the scanning lines is formed to have a portion having a decreased width in the area at which one of the scanning lines and one of the signal lines intersect with each other, the portion acting as a gate electrode.

It is preferable that the island is formed on each of the scanning lines at the portion having a decreased width, the gate insulating film and the semiconductor layer both being greater in width than the portion.

It is preferable that the method further includes the step of forming a first ohmic layer and a second ohmic layer both on the semiconductor layer such that the first and second ohmic layers are spaced away from each other, the first ohmic layer being formed as an extension of each of the signal lines and acting as the drain electrode, the second ohmic layer acting as the source electrode.

It is preferable that each of the signal lines is formed to have a portion having a decreased width in the area at which one of the scanning lines and one of the signal lines intersect with each other, the portion acting as the drain electrode.

The advantages obtained by the aforementioned present invention will be described hereinbelow.

In accordance with the present invention, an island of a thin film transistor is formed in an area at which a scanning line and a signal line intersect with each other. As a result, it is no longer necessary to arrange a thin film transistor in a pixel area defied by a scanning line and a signal line. Since only a contact hole is formed in a pixel area for electrically connecting a source electrode and a transparent electrode to each other, it would be possible to prevent an area of a pixel area, that is, an area of a transparent electrode from being reduced by a thin film transistor, ensuring enhancement of an aperture ratio.

In accordance with the present invention, it is possible to form both of a source electrode and a signal line as a drain electrode in a common step of carrying out photolithography to an electrically conductive film. Thus, it is possible to reduce the number of steps of carrying out photolithography by once in comparison with a conventional method of fabricating a liquid crystal display device in which source/drain electrodes and a signal line are formed in separate photolithography steps. As a result, a process of fabricating the liquid crystal display device can be simplified.

The above and other objects and advantageous features of the present invention will be made apparent from the following description made with reference to the accompanying drawings, in which like reference characters designate the same or similar parts throughout the drawings.

DESCRIPTION OF THE PREFERRED EMBODIMENTS

Preferred embodiments in accordance with the present invention will be explained hereinbelow with reference to drawings.

[First Embodiment]

Figure 2:
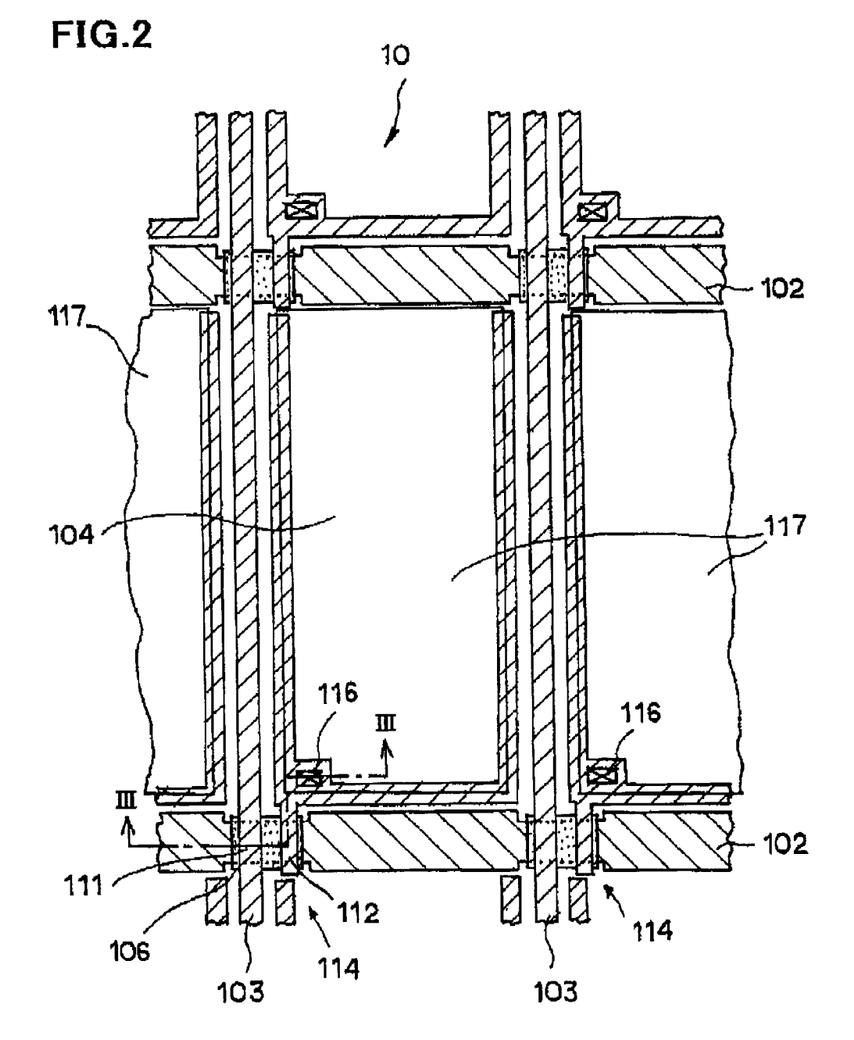
FIG. 2 is a top plan view of a TFT substrate in a liquid crystal display device in accordance with the first embodiment of the present invention.
Figure 3:
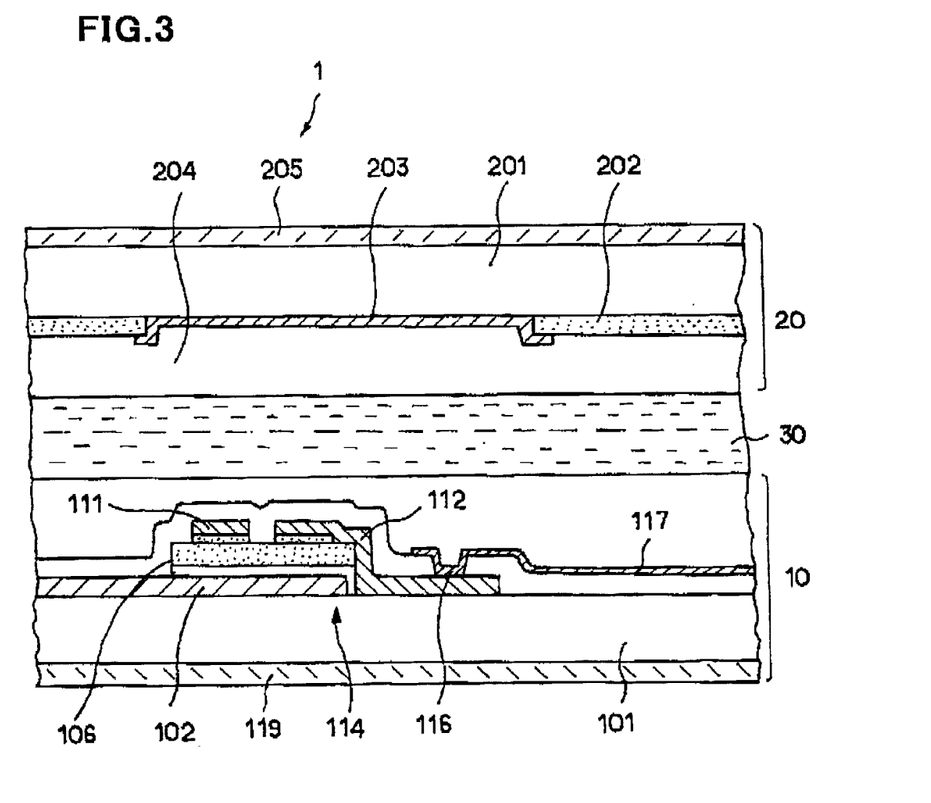
FIG. 3 is a cross-sectional view taken along the line III—III in FIG. 2.

FIG. 2 is a top plan view of a TFT substrate 10 in a liquid crystal display device in accordance with the first embodiment of the present invention, and FIG. 3 is a cross-sectional view of a liquid crystal display device 1 including the TFT substrate 10, that is, a cross-sectional view taken along the line III—III in FIG. 2.

With reference to FIG. 3, the liquid crystal display device 10 in accordance with the first embodiment is comprised of a TFT substrate 10, an opposing substrate 20, and a liquid crystal layer 30 sandwiched between the TFT substrate 10 and the opposing substrate 20.

With reference to FIGS. 2 and 3, the TFT substrate 10 includes a transparent glass substrate 101, a plurality of scanning lines or gate lines 102 formed at a surface of the glass substrate 101, extending in a column direction, and a plurality of signal lines or drain lines 103 formed at a surface of the glass substrate 101, extending in a row direction, that is, extending perpendicularly to the scanning lines 102. Each of the scanning lines 102 is composed of titanium (Ti), for instance, and is spaced away from adjacent ones by a predetermined distance. Each of the signal lines 103 is composed of chromium (Cr), for instance, and is spaced away from adjacent ones by a predetermined distance. A rectangular area surrounded by each one of the scanning lines 102 and each one of the signal lines 103 defines a pixel area 104.

Figure 4:
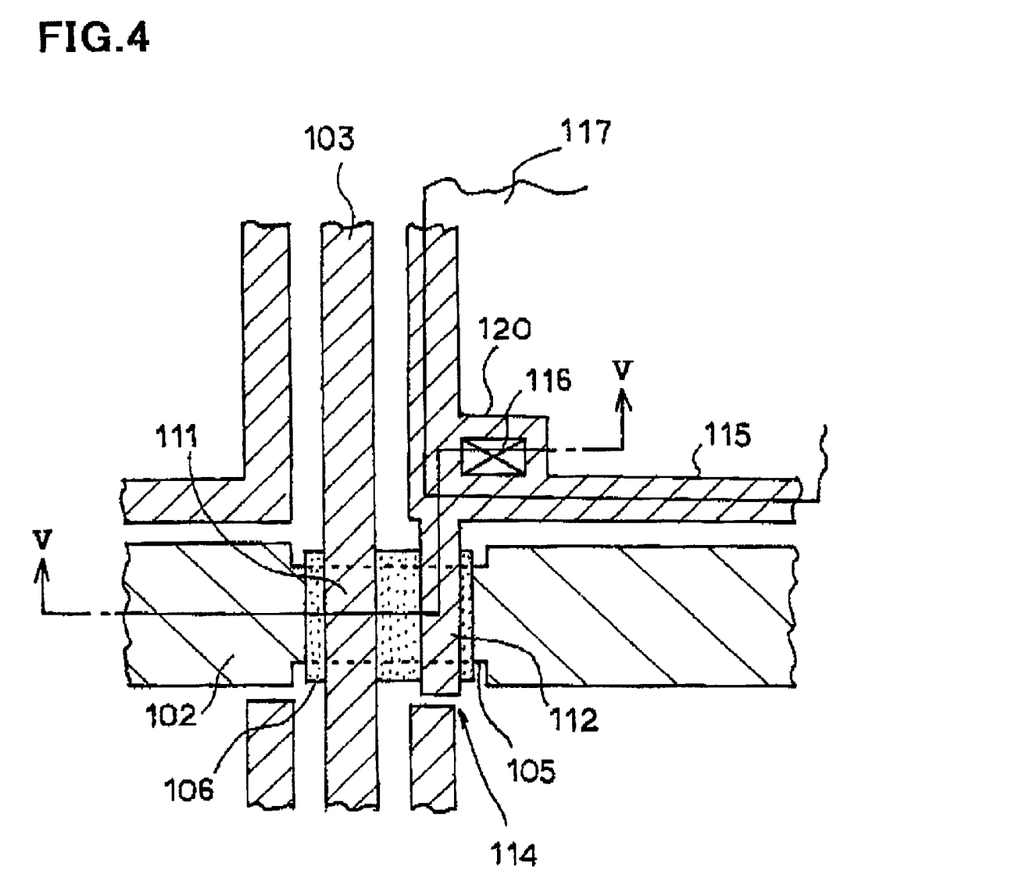
FIG. 4 is a partially enlarged view of a thin film transistor illustrated in FIG. 2.
Figure 5:
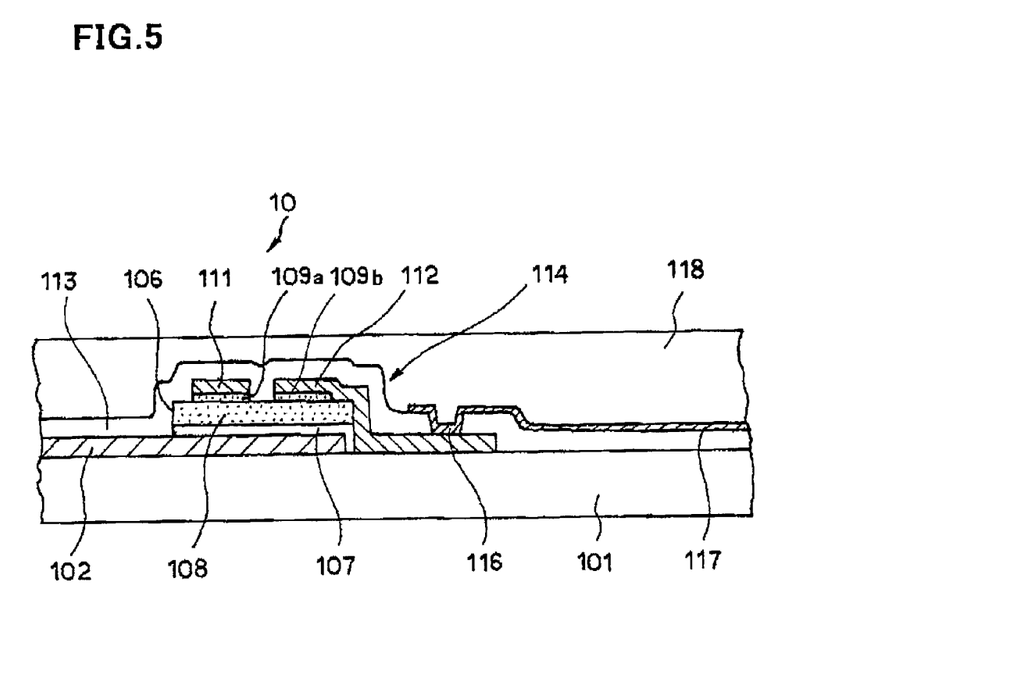
FIG. 5 is a cross-sectional view taken along the line V—V in FIG. 4.

FIG. 4 is a partially enlarged view of a thin film transistor illustrated in FIG. 2, and FIG. 5 is a cross-sectional view taken along the line V—V in FIG. 4.

As illustrated best in FIG. 4, the scanning line 102 is designed to have a portion having a reduced width in an area at which the scanning line 102 and the signal line 103 intersect with each other. The portion having a reduced width act as a gate electrode 105 of a later mentioned thin film transistor 114.

As illustrated in FIG. 5, an island 106 is formed on the gate electrode 105. The island 106 is comprised of a gate insulating film 107 formed on the gate electrode 105, an amorphous silicon layer 108 formed on the gate insulating film 107, and ohmic layers 109a and 109b both formed on the amorphous silicon layer 108. The gate insulating film 107, the amorphous silicon layer 108 and the ohmic layers 109a and 109b have a predetermined pattern, and have a width slightly greater than a width of the gate electrode 105. The ohmic layers 109a and 109b both composed of n+ amorphous silicon are slightly spaced away from each other, and act as source and drain regions of the thin film transistor 114.

An extension of the signal line 103 is formed on the ohmic layer 109a, and defines a drain electrode 111, Similarly, a source electrode 112 is formed on the ohmic layer 109b.

As illustrated in FIG. 5, the scanning line 102, the island 106, the drain electrode 111 and the source electrode 112 are covered with an interlayer insulating film 113 to thereby define the thin film transistor 114.

The source electrode 112 is comprised of a metal film of which the drain electrode 111 or the signal line 103 is composed. As illustrated in FIG. 4, the source electrode 112 is connected at an end thereof with a light-shielding layer 115 formed along a periphery of the pixel area 104 in the form of "?".

As illustrated in FIGS. 2 to 5, the source electrode 112 is a transparent electrode 117 composed of indium tin oxide (ITO) is formed on the interlayer insulating film 113 in the pixel area 104. As illustrated best in FIG. 4, the source electrode 112 is electrically connected to the transparent electrode 117 through a contact hole 116 formed throughout the interlayer insulating film 113.

An alignment 118 is formed on both the interlayer insulating film 113 and the transparent electrode 117. A polarizer 119 is formed on the glass substrate 101 at the opposite side of the scanning line 102.

As illustrated in FIG. 16, the opposing substrate 20 arranged in facing relation with the TFT substrate 10 is comprised of a transparent glass substrate 201, a color filter 202 formed on the glass substrate 201, a black matrix layer 203 formed on the glass substrate 201, an alignment film 204 formed covering the color filter 202 and the black matrix layer 203 therewith, and a polarizer 205 formed on the glass substrate 201 at the opposite side of the black matrix layer 203.

Spacers (not illustrated) are sandwiched between the TFT substrate 10 and the opposing substrate 20 for ensuring a gap therebetween. Liquid crystal is introduced into the gap to thereby form the liquid crystal layer 30. The TFT substrate 10 and the opposing substrate 20 are sealed at their periphery to prevent the liquid crystal from leaking out.

FIGS. 6A to 6D illustrate respective steps of a method of fabricating the TFT substrate 10. Hereinbelow is explained a method of fabricating the TFT substrate 10, with reference to FIGS. 6A to 6D.

Figure 6A:
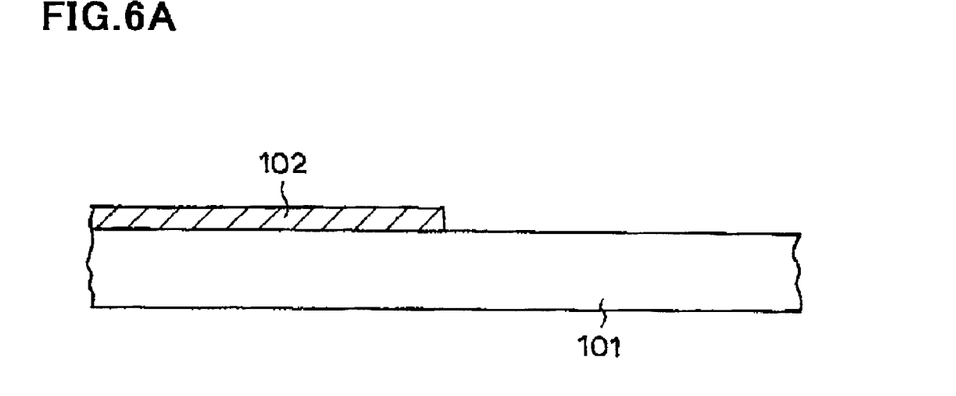
FIGS. 6A to 6D are cross-sectional views of a liquid crystal display device in accordance with the first embodiment, illustrating respective steps of a method of fabricating the same.

First, as illustrated in FIG. 6A, titanium (Ti) is deposited on the glass substrate 101 by sputtering, and then, patterned into the scanning line 102 by the first photolithography and etching.

Figure 6B:
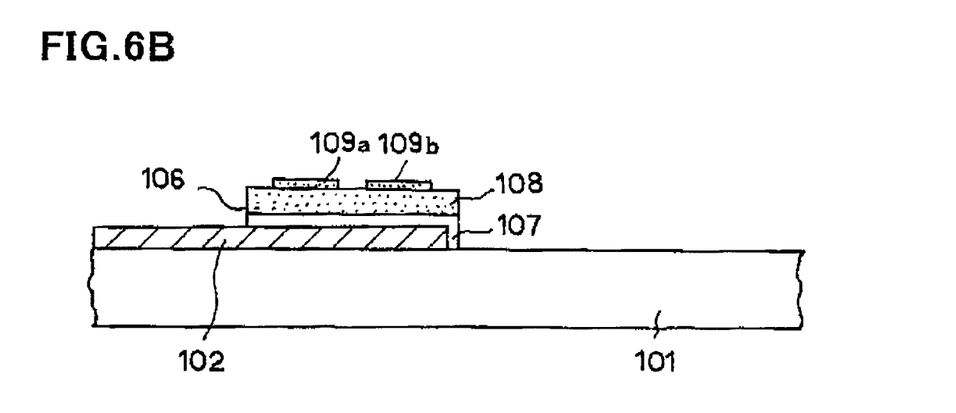

Then, a silicon nitride (SiN) film as the gate insulating film 107, the amorphous silicon film 108 and an n+ amorphous silicon film 109 are formed successively on the scanning line 102 by chemical vapor deposition. Then, as illustrated in FIG. 6B, the gate insulating film 107, the amorphous silicon film 108 and the n+ amorphous silicon film 109 are patterned into the island 106 by the second photolithography and etching.

Then, the n+ amorphous silicon film 109 is patterned into the ohmic layers 109a and 109b by the third photolithography and etching.

If a mask used in the second photolithography is designed to have a first portion for a channel region which first portion has a thickness smaller than a thickness of a second portion for source and drain regions, it would be possible to pattern the films 107 to 109 into the island 106 and further pattern the n+ amorphous silicon film 109 into the ohmic layers 109a and 109b only by the second photolithography.

Figure 6C:
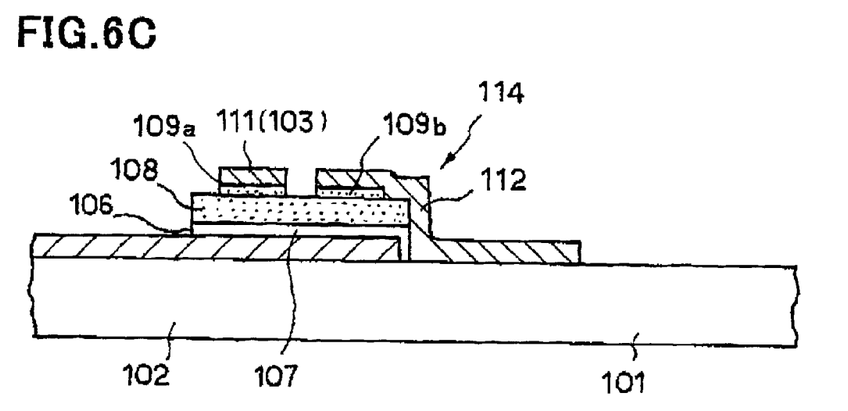

Then, chromium (Cr) is deposited entirely over a resultant by sputtering. Then, the chrominum is patterned into the signal line 103 by the fourth photolithography and etching, as illustrated in FIG. 6C. A part of the signal line 103 defines the drain electrode 111. The source electrode 112 is formed concurrently with the formation of the signal line 103. Thus, the drain electrode 111 comprised of a part of the signal line 103 and the source electrode 112 are arranged on the ohmic layers 109a and 109b, respectively. Thus, there is completed the thin film transistor 114.

As illustrated in FIG. 4, the source electrode 112 is connected to the light-shielding layer 115 extending along a periphery of the pixel area 104 in the form of "⊐".

A rectangular area 120 at which the source electrode 112 is connected to the light-shielding layer 115 is designed to have an increased width or an enlarged area for forming the contact hole 116 therein.

Figure 6D:
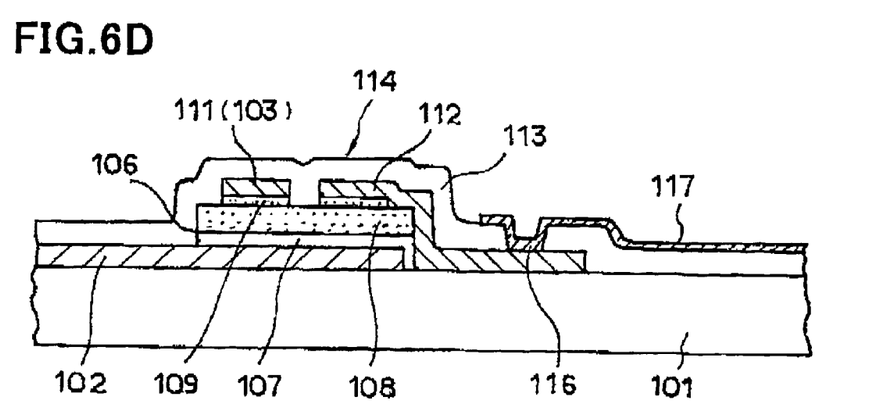

Then, silicon nitride is deposited by chemical vapor deposition, and subsequently, patterned into the interlayer insulating film 113, as illustrated in FIG. 6D.

Then, the contact hole 116 is formed throughout the interlayer insulating film 118 by the fifth photolithography and etching so as to partially expose the source electrode 112.

Then, indium tin oxide (ITO) is deposited by sputtering, and subsequently, patterned into the transparent electrode 117 in the pixel area 104 by the sixth photolithography and etching. The transparent electrode 117 is electrically connected to the source electrode 112 through the contact hole 116.

Thereafter, though not illustrated, the alignment film 118 is formed all over a resultant, and the polarizer 109 is formed on the glass substrate 101 at its lower surface. Thus, the TFT substrate 10 is completed.

In the TFT substrate 10, the island 106 of the thin film transistor 114 is formed, in an area at which the scanning line 102 and the signal line 103 intersect with each other, such that the island 106 is almost within a width of the scanning line 102. Accordingly, it is no longer necessary to arrange the thin film transistor 114 in the pixel area 104 surrounded by the scanning line 102 and the signal line 103. In the pixel area 104 is formed on the contact hole 106 through which the source electrode 112 is electrically connected to the transparent electrode 117. Hence, an area of the pixel area 104, namely, an area of the transparent electrode 117 is not reduced by the thin film transistor 114 in the liquid crystal display device 10 in accordance with the first embodiment, ensuring enhancement of an aperture ratio.

Figure 7:
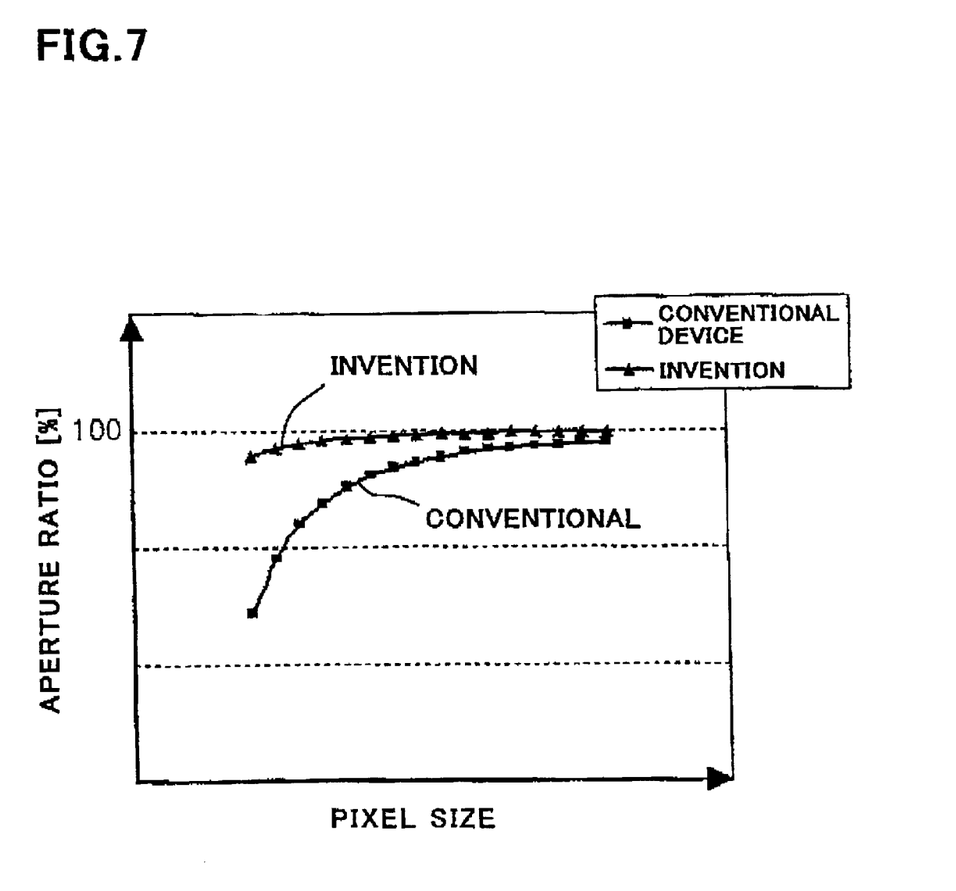
FIG. 7 is a graph showing a relation between a pixel size and an aperture ratio in both of a conventional liquid crystal display device and a liquid crystal display device in accordance with the first embodiment.

FIG. 7 is a graph showing a relation between an aperture ratio and a length of a side of the pixel area 104 (pixel size) which is varied in the range of 100 to 400 micrometers. It is assumed in FIG. 7 that a size of the thin film transistor 114, a width of each of the lines, and a size of the contact hole 116 remain unchanged, even if a pixel size varies.

As is obvious in view of FIG. 7, it is understood that even if a pixel size is small, it would be possible to suppress reduction in an aperture ratio, and that the present invention suppresses reduction in an aperture ratio to a greater degree in a smaller pixel size in comparison with a conventional liquid crystal display device.

In accordance with the above-mentioned method of fabricating the liquid crystal display device 10 in accordance with the first embodiment, it would be possible to concurrently form the signal line 103 and the source electrode 102 in a common photolithography to be carried out for etching a common metal film, specifically, the fourth photolithography in the first embodiment. Accordingly, comparing to the above-mentioned conventional method in which source/drain electrodes and a signal line are formed in separate photolithography steps, the present invention makes it possible to reduce the number of photolithography steps by once, ensuring simplification in fabrication of a liquid crystal display device.

[Second Embodiment]

Figure 8:
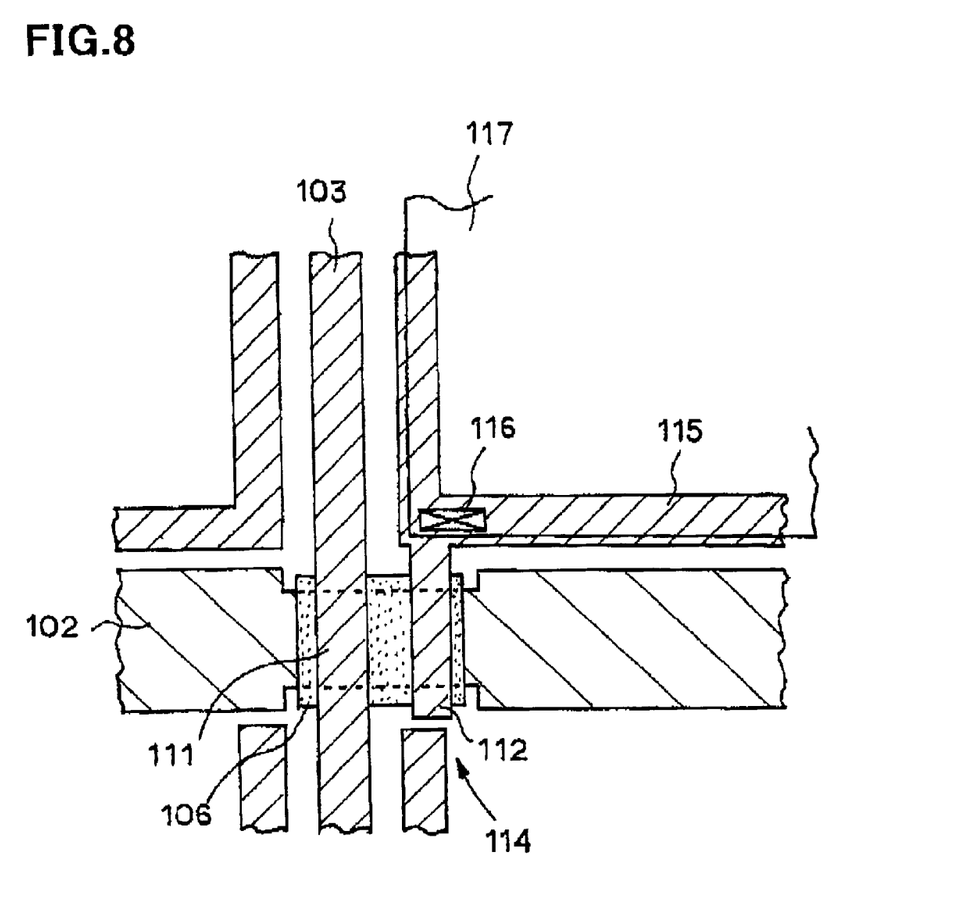
FIG. 8 is a partially enlarged view of a thin film transistor in a liquid crystal display device in accordance with the second embodiment of the present invention.

FIG. 8 is a partially enlarged view of a TFT substrate in a liquid crystal display device in accordance with the second embodiment. FIG. 8 corresponds to FIG. 4, and parts or elements that correspond to those of the TFT substrate 10 illustrated in FIG. 4 have been provided with the same reference numerals, and operate in the same manner as corresponding parts or elements in the first embodiment, unless explicitly explained hereinbelow.

In the above-mentioned first embodiment, the source electrode 112 is designed to have the rectangular area 120 at which the source electrode 112 is connected to the light-shielding layer 115. The rectangular area 120 is designed to have an increased width or an enlarged area for forming the contact hole 116 therein. In contrast, the source electrode 120 in the second embodiment is designed not to have an enlarged area corresponding to the rectangular area 120, but the contact hole 116 is designed to have a rectangular cross-section having a longer side extending in a length-wise direction of the Tight-shielding layer 115.

In accordance with the second embodiment, since the source electrode 112 does not have a portion projecting into the pixel area 104, it would be possible to avoid an area of the pixel area 104 from being reduced, and hence, enhance an aperture ratio.

[Third Embodiment]

Figure 9:
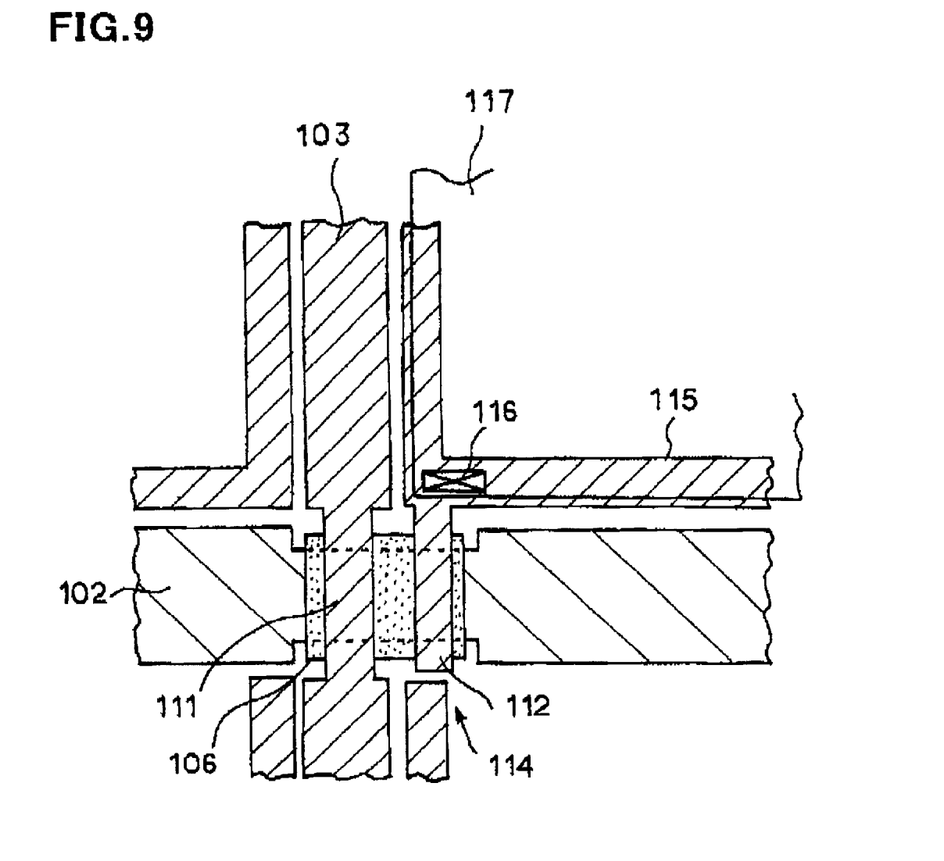
FIG. 9 is a partially enlarged view of a thin film transistor in a liquid crystal display device in accordance with the third embodiment of the present invention.

FIG. 9 is a partially enlarged view of a TFT substrate in a liquid crystal display device in accordance with the third embodiment. FIG. 9 corresponds to FIG. 4, and parts or elements that correspond to those of the TFT substrate 10 illustrated in FIG. 4 have been provided with the same reference numerals, and operate in the same manner as corresponding parts or elements in the first embodiments unless explicitly explained hereinbelow.

In the third embodiment, the signal line 103 is designed to have a portion having a reduced width, in an area at which the scanning line 102 and the signal line 103 intersect with each other. The portion having a reduced width is designed to extend across the island 106 for acting as the drain electrode 111.

In accordance with the third embodiment, it would be possible to design the signal line 103 to have an increased width in almost all portions thereof in a length-wise direction, ensuring reduction in a resistance of the signal line 103.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

The entire disclosure of Japanese Patent Application No. 2001-173578 filed on Jun. 8, 2001 including specification, claims, drawings and summary is incorporated herein by reference in its entirety.

What is claimed is:

1. An active matrix type liquid crystal display device comprising:
   (a) a transparent substrate;
   (b) a plurality of scanning lines formed on said transparent substrate;
   (c) a plurality of signal lines formed on said transparent substrate perpendicularly to the scanning lines;
   (d) a transparent electrode arranged in a pixel area defined by said scanning and signal lines; and
   (e) a thin film transistor formed in association with said transparent electrode,
   wherein said thin film transistor is formed in an area at which one of said scanning lines and one of said signal lines intersect with each other,
   wherein said thin film transistor includes source and drain regions both comprised of an electrically conductive film of which said signal lines are comprised, and
   wherein each of said scanning lines has a portion having a decreased width in said area at which one of said scanning lines and one of said signal lines intersect with each other, said portion acting as a gate electrode of said thin film transistor.

2. The active matrix type liquid crystal display device as set forth in claim 1, wherein said thin film transistor is comprised of:
   (e1) an island including a gate insulating film and a semiconductor layer both formed on each of said scanning lines in said area at which one of said scanning lines and one of said signal lines intersect with each other;
   (e2) a drain electrode comprised of a part of each of said signal lines which part extends across said island; and
   (e3) a source electrode comprised of an electrically conductive film of which each of said signal lines is comprised, and formed on said island with being spaced away from said drain electrode.

3. The active matrix type liquid crystal display device as set forth in claim 1, further comprising a light-shielding layer surrounding said transparent electrode and being connected to said source electrode, said light-shielding layer being formed with a contact hole through which said source electrode is electrically connected to said transparent electrode.

4. The active matrix type liquid crystal display device as set forth in claim 3, wherein said light-shielding layer has a portion having an increased width, said contact hole being formed at said portion.

5. The active matrix type liquid crystal display device as set forth in claim 3, wherein said light-shielding layer has a uniform width.

6. The active matrix type liquid crystal display device as set forth in claim 5, wherein said contact hole is located within said light-shielding layer of uniform width.

7. The active matrix type liquid crystal display device as set forth in claim 6, wherein said contact hole has a rectangular cross-section having a longer side extending in a length-wise direction of said light shielding layer.

8. The active matrix type liquid crystal display device as set forth in claim 1, further comprising an island formed on each of said scanning lines at said portion having a decreased width, said island including a gate insulating film and a semiconductor layer both of which is greater in width than said portion.

9. The active matrix type liquid crystal display device as set forth in claim 8, further comprising a first ohmic layer and a second ohmic layer both formed on said semiconductor layer such that said first and second ohmic layers are spaced away from each other, said first ohmic layer being formed as an extension of each of said signal lines and acting as a drain electrode of said thin film transistor, said second ohmic layer acting as a source electrode of said thin film transistor.

10. The active matrix type liquid crystal display device as set forth in claim 1, wherein each of said signal lines has a portion having a decreased width in said area at which one of said scanning lines and one of said signal lines intersect with each other, said portion acting as a drain electrode of said thin film transistor.

11. A method of fabricating an active matrix type liquid crystal display device, comprising the steps of:

(a) forming a plurality of scanning lines on a transparent substrate;

(b) forming an island in an area at which one of said scanning lines and one of later mentioned signal lines intersect with each other, said island including a gate insulating film, a semiconductor layer and an ohmic layer all formed on each of said scanning lines in this order;

(c) forming a plurality of signal lines extending perpendicularly to said scanning lines, each of said signal lines including a portion located on said island and acting as a drain electrode;

(d) forming a source electrode on said island such that said source electrode faces and is spaced away from said drain electrode;

(e) forming an interlayer insulating film entirely over a resultant resulted from said step (d);

(f) forming a contact hole so that said source electrode partially appears;

(g) forming a transparent electrode in a pixel area defined by said scanning and signal lines; and (h) electrically connecting said transparent electrode to said source electrode through said contact hole, wherein each of said scanning lines is formed to have a portion having a decreased width in said area at which one of said scanning lines and one of said signal lines intersect with each other, said portion acting as a gate electrode.

12. The method as set forth in claim 11, wherein said steps (c) and (d) are concurrently carried out.

13. The method as set forth in claim 11, wherein each of said signal lines and said source electrode are concurrently formed in a common photolithography step.

14. The method as set forth in claim 11, further comprising the step at forming a light-shielding layer which surrounds said transparent electrode and is connected to said source electrode, said light-shielding layer being formed with said contact hole.

15. The method as set forth in claim 14, wherein said light-shielding layer is formed to have a portion having an increased width, said contact hole being formed at said portion.

16. The method as set forth in claim 14, wherein said light-shielding layer is formed to have a uniform width, and said contact hole is located within said light-shielding layer of uniform width.

17. The method as set forth in claim 16, wherein said contact hole is formed to have a rectangular cross-section having a longer side extending in a length-wise direction of said light-shielding layer.

18. The method as set forth in claim 11, wherein said island is formed on each of said scanning lines at said portion having a decreased width, said gate insulating film and said semiconductor layer both being greater in width than said portion.

19. The method as set forth in claim 18, further comprising the step of forming a first ohmic layer and a second ohmic layer both on said semiconductor layer such that said first and second ohmic layers are spaced away from each other, said first ohmic layer being formed as an extension of each of said signal lines and acting as said drain electrode, said second ohmic layer acting as said source electrode.

20. The method as set forth in claim 11, wherein each of said signal lines is formed to have a portion having a decreased width in said area at which one of said scanning lines and one of said signal lines intersect with each other, said portion acting as said drain electrode.

* * * * *